United States Patent [19]

Astheimer

[11] Patent Number: 4,654,518

[45] Date of Patent: Mar. 31, 1987

[54] SCANNING HORIZON SENSOR

[75] Inventor: Robert W. Astheimer, Westport, Conn.

[73] Assignee: Barnes Engineering Company, Stamford, Conn.

[21] Appl. No.: 623,991

[22] Filed: Jun. 25, 1984

[51] Int. Cl.$^4$ .............................................. G01J 1/20
[52] U.S. Cl. .............................. 250/203 R; 250/236; 250/227
[58] Field of Search ........... 250/236, 235, 234, 203 R, 250/342, 347, 227, 551

[56] References Cited

U.S. PATENT DOCUMENTS

| | | | |
|---|---|---|---|
| 3,255,357 | 6/1966 | Kapany et al. | 250/227 |
| 3,311,747 | 3/1967 | Smith, Jr. et al. | 250/227 |
| 3,510,667 | 5/1970 | Cleveland et al. | 250/227 |
| 4,017,145 | 4/1977 | Jerie | 250/236 |
| 4,472,052 | 9/1984 | Löfgren | 250/227 |

OTHER PUBLICATIONS

E. J. Farrell and R. L. Lillestrand, "Celestial Successor to Inertial Guidance", *Electronics* Mar. 21, 1966 pp. 115-124, v. 39, N. 6.

*Primary Examiner*—David C. Nelms
*Assistant Examiner*—Michael Messinger
*Attorney, Agent, or Firm*—Parmelee, Bollinger & Bramblett

[57] ABSTRACT

A scanning horizon sensor for indicating orientation by sensing a line of discontinuity in optical radiation in a field of view between a reference body and outer space is provided in which a scanning turret is mounted on one end of a motor shaft of any conventional design or make. A detector is positioned on the optical axis of the horizon sensor for detecting optical radiation applied thereto by the scanning turret generating detector signals in accordance with the intensity of the optical radiation applied. The motor shaft is provided with a small hole drilled axially through the motor shaft which houses an optical fiber which serves to transfer the focal point from one end of the motor shaft to the other where a stationary lens focuses the radiation emitted from the outer end of the optical fiber onto the detector. The use of an optical fiber on a standard motor shaft eliminates the need for large bearings surrounding the more conventional hollow rotating motor shaft employed in conical scan-type horizon sensors. Advantageously, the life and reliability of the bearings are extended without compromising the compact nature of the sensor provided.

5 Claims, 3 Drawing Figures

SCANNING HORIZON SENSOR

BACKGROUND OF THE INVENTION

This invention relates to scanning type horizon sensors for indicating orientation by sensing a line of discontinuity in optical radiation between a reference planet and outer space, and more particularly, to such horizon sensors in which optical fibers are mounted in a standard motor shaft for driving the scanning mechanism of the sensor which transfers the focal point of radiation image thereon from one end of the motor shaft to the other.

Horizon sensors are devices which are mounted in satellites, space probes and the like which sense the horizon of a reference planet and produce a signal which indicates the orientation of the satellite carrying the sensor. Almost all unmanned satellites employ horizon sensors for attitude control and guidance. The attitude of the satellite is determined by its position with respect to three axes at right angles to each other, two of which are in a plane at right angles to a projected radius of the earth passing through the satellite and the third of which coincides with that radius. One way of deriving such information is by the use of a conical scan horizon sensor for example, of the type shown and described in U.S. Pat. No. 3,020,406 which is assigned to the Assignee of the present invention utilizing the horizon representing a line of discontinuity between the earth's atmosphere and outer space. This line of discontinuity is characterized by a large difference in infrared radiation between outer space and the earth which is considerably warmer and provides a large amount of infrared radiation as compared with space. Accordingly, the horizon represents a sharp line of discontinuity which provides an abrupt and sharp change of infrared radiation on either side which characteristic is utilized by scanning the detector in a conical pattern across the horizon and deriving electrical output signals marking that line of discontinuity. By using reference pulses as the scan passes predetermined points in a vehicle, the intervals between the horizon crossings and the reference pulses may be compared to produce an output signal providing information with respect to the attitude of the vehicle with respect to the horizon. Such horizon sensors have been very successful in space flight and have been used on many manned as well as unmanned satellites.

Originally, the motor which drove the optical scanner did so through a rotating assembly journaled on ball bearings on a detector lens mount. The scanning mechanism was ultimately improved by having the scanning axis of rotation of the motor shaft coincide with the optical axis of the scanning mechanism by providing a hollow shaft motor and mounting the detector inside the hollow shaft. The problem with this arrangement is that the sensor requires relatively large bearings to surround the hollow rotating motor shaft.

SUMMARY OF THE INVENTION

Accordingly, it is an object of this invention to provide a new and improved scanning horizon sensor with increased life and reliability by reducing the diameter of the bearings required.

A further object of this invention is to provide a new and improved scanning horizon sensor which may employ a solid motor shaft of any conventional design and make modified in accordance with the present invention thereby permitting the use of developed, space qualified motors which have operated for many years in a vacuum environment.

Still a further object of this invention is to provide a new and improved scanning type horizon sensor which may utilize the conical scan or a scanning turret using a cross or a tic-tac-toe scan as desired.

Still a further object of this invention is to provide a new and improved horizon sensor which may utilize prisms instead of reflective optics to produce scanning with smaller cone angles.

In carrying out this invention in one illustrative embodiment thereof, a horizon sensor is provided for indicating orientation by sensing a line of discontinuity in optical radiation in a field of view between a reference body and outer space. The horizon sensor has a detector means positioned on the optical axis of the sensor for detecting said optical radiation and generating detector signals in accordance with the intensity of the optical radiation. Scanning means driven by a motor shaft of a drive motor are provided with the scanning means applying the optical radiation to the detector means. The scanning means are mounted on a first end of the motor shaft and include optical means for focusing the instantaneous field of view of the scanning means onto the axis of the motor shaft which coincides with the optical axis of the sensor. A small hole extending axially through the motor shaft houses optical fiber means for transferring the focal point from the first end of the motor shaft to the second end of the motor shaft where the detector means are mounted for receiving the optical radiation applied thereto by the scanning means which has been conducted through the optical fiber means in the shaft.

Advantageously, the use of a standard motor shaft of motors which have been developed and already been space qualified and operated for many years in vacuum environments may be used in place of hollow shaft motors or other scanning drives which require large diameter bearings as compared with a regular motor drive shaft. The use of smaller diameter bearings will provide increased life and reliability for the scanning sensor. In addition, the fiber optics have the facility to be shaped in elongated linear form which due to the rotation of the fiber optic in the shaft does not cause a rotation of the image of the horizon thereby providing a more definitive crossing.

A particular adaptation of providing fiber optics through the motor shaft which drives the scanning turret permits the use of a variety of scanning arrangements for example, a mirror for deriving 180° scanning cone or a prism which cuts the scanning angle to approximately 120° or a variety of pyramidal mirrors may be used for providing scanning in more than one plane.

BRIEF DESCRIPTION OF THE DRAWINGS

The invention, together with further objects, aspects, advantages and features thereof will be better understood from the following description taken in conjunction with the accompanying drawings.

DESCRIPTION OF THE PREFERRED EMBODIMENTS

Figure 1:
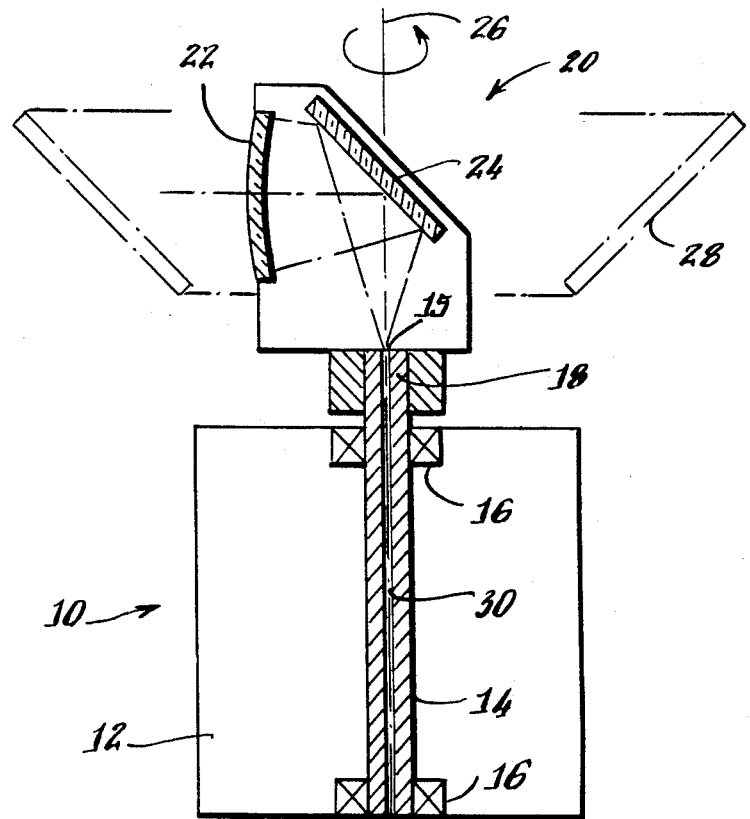
FIG. 1 is a diagrammatic representation partly in vertical section through a sensor head using a mirror, conical scanning turret and an alternate type turret illustrated in phantom.

Referring now to FIG. 1, a horizon sensor referred to generally with the reference character 10 comprises a motor 12 having a motor drive shaft 14 housed in and driven by the bearing 16. A first end 18 of the motor shaft 14 carries a scanning turret referred to generally with the reference numeral 20. The scanning turret 20 is rotated by the motor drive shaft 14 and carries in the form shown in FIG. 1 an objective lens 22 and a scanning mirror 24 with the scanning mirror being mounted on a 45° angle with the axis of rotation 26 of the drive shaft which coincides with the optical axis of the scanning turret 20. The 45° angle mirror 24 of the scanning turret 20 provides a 180° cone angle producing a great circle scan. The mirror 24 could be replaced by a germanium prism such as illustrated in the aforesaid U.S. Pat. No. 3,020,407 to produce a smaller cone angle. In addition, the turret 20 may utilize a stationary pyramidal mirror assembly 28 as shown in dotted form on FIG. 1 to produce a cross or tic-tac-toe scan of the type illustrated in U.S. Pat. No. 4,328,421 of Gerald Falbel which is assigned to the Assignee of the present invention. The scanning turret of the Falbel patent which may employ two, three or four in number, each of which scans the detector over a different pattern across the reference planet may be conveniently used for the turret 20 illustrated in FIG. 1.

In accordance with the present invention, turret 20 uses the objective lens 22 and the mirror 24 to focus the instantaneous field of view of the sensor 10 onto the axis 26 of the motor shaft 14. In accordance with the present invention a thin hole approximately 1 mm in diameter is drilled axially through the motor shaft 14 and an optical fiber means 30 is inserted through the axial hole 15 to transfer the focal point of the first end 18 of the motor shaft 14 to the second end 19 of the motor shaft. A stationary lens 32 focuses the radiation emitted from the output end of the optical fiber means 30 onto an optical detector 34 of a detector assembly 35. The optical fiber 30 and the detector 34 must be able to respond to the optical radiation applied thereto and normally they will respond to infrared radiation which is primarily used in horizon sensors but it should be understood that the invention is not considered limited to the use of infrared radiation and may include other optical radiation.

It will be appreciated that the drawing is not to scale and is diagrammatic to simplify the illustration as well as the explanation and to focus on the invention. The requirements of the optical fiber means 30 which may be in the form of a single fiber or an optical fiber bundle, are not stringent, since it may be straight and approximately 2 inches long. One example of a fiber which may be utilized for infrared applications are Horiba's (Kristen/5), infrared optical fiber which is made of Krs-5 amd is 1 mm in diameter. The transmission of such fiber is 65% at 14 microns over a length of 1 meter. The diameter of the optical fiber establishes the instantaneous field of view of the sensor. At a focal length of 50 mm, a 1 mm diameter fiber gives a field of 20 milleradians or 1.5° which is an appropriate field. This is merely one type of fiber and the type and number of fibers used will depend on a specific application. The great advantage in utilizing the optical fibers 30 is to reduce the inside diameter of the bearing 16 which could be approximately 0.20 inches in the present application. This reduction in inside diameter provides a factor of 5 reduction in known hollow shaft bearings which have been utilized in conical scan horizon sensors. This is accomplished by an equal reduction in the circumference labyrinth seals which reduces the diffusion leakage of bearing lubricant. The reduction in bearing diameter as well as the reduction of the circumference of the bearing seals are two factors which greatly increase the possible life of the bearings.

An additional advantage of the present invention is that the only modification required of the motor is to drill a small axial hole in the motor shaft 14. This permits the use of developed motors particularly those which have already been space qualified and operated for many years in a vacuum environment.

Figure 3:
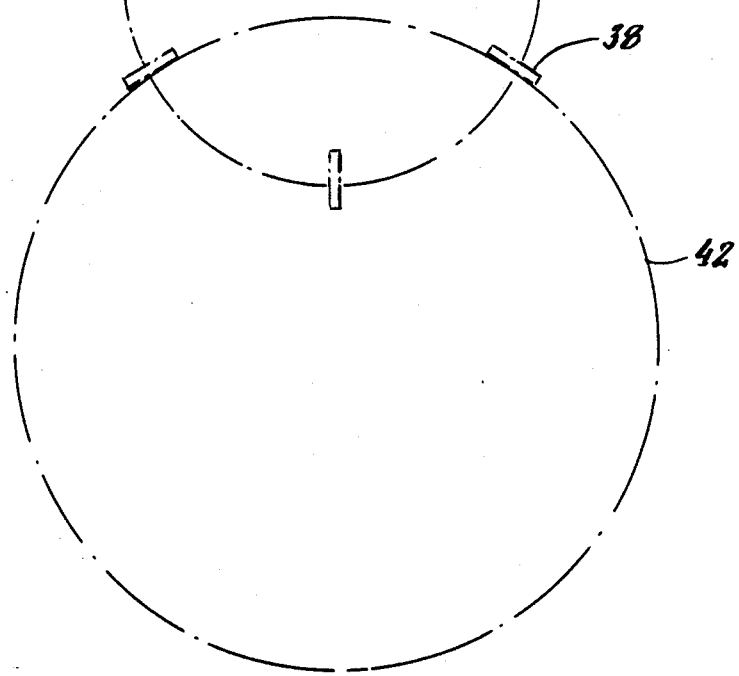
FIG. 3 illustrates one configuration of an optical fiber bundle which may be utilized with the present invention and is illustrated in the scan pattern shown in FIG. 2.

FIG. 3 illustrates a modified version of the fiber optic means 30 by providing a fiber optical bundle 36 in which the fibers are arranged at one end 38 in an elongated linear array while terminating at the other end 40 in a circular configuration for focusing by the lens 32 from the detector 34 of the detector assembly 35. The only restriction on this configuration is the size of the hole 15 which is drilled in the shaft 14. The hole may not be larger than can conveniently be drilled in a standard motor shaft utilized in this type of application. The additional space in the hole 15 in the shaft 30 due to the various configurations on the ends 38 and 40 of the fiber optical bundle 36 may be filled with epoxy or other suitable material.

Figure 2:
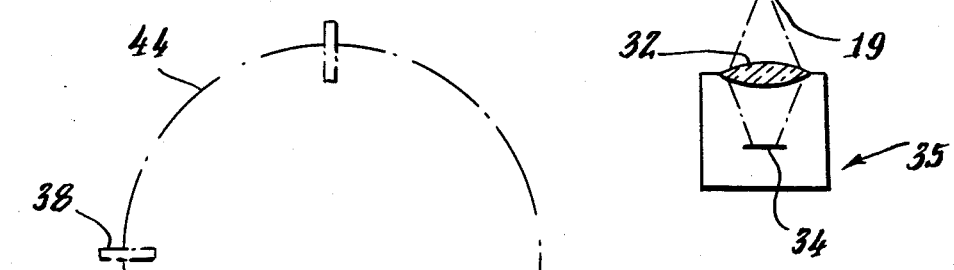
FIG. 2 illustrates a conical scan pattern over the earth's disc.

FIG. 2 illustrates the earth disc 42 being scanned in a conical scan pattern 44 which is traced by the scanning of the scanning turret 20. The end of the fiber optic bundle 38 is shown as it moves along the earth and around the scan pattern illustrating that as the shaft rotates the image is not inverted providing an advantage in this type of configuration for the optic bundle. The elongated configuration 38 of the optical bundle 36 provides a sharper disc 42 crossing than for example, would a circular configuration, for example, of the type illustrated on the end 40 of the optical bundle 36.

By incorporating optical fiber means in a standard motor shaft, a very compact and effective scanning horizon sensor can be provided which requires smaller diameter bearings thereby providing less wear and tear and longer life on the moving parts of the scanning sensor. The present invention also conveniently provides the accommodation of several types of scanning patterns by modifying the scanning turret.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A horizon sensor for indicating orientation by sensing a line of discontinuity in optical radiation in a field of view between a reference body and outer space having an infrared detector means positioned on the optical axis of said horizon sensor for detecting said optical radiation and generating detector signals in accordance with the intensity of said optical radiation and scanning means driven by a motor shaft of a drive motor, said scanning means applying said optical radiation to said detector means, the improvement comprising:

said scanning means mounted on a first end of said motor shaft and including optical means for focusing the instantaneous field of view of said scanning means onto the axis of said motor shaft which coincides with said optical axis, a small hole having a diameter of not more than 1 mm extending axially through said motor shaft, an infrared optical fiber means mounted in said small hole in said motor shaft for transferring the focal point from said first end of said motor shaft to a second end of said motor shaft, said detector means mounted with respect to said second end of said motor shaft for receiving the infrared optical radiation applied thereto by said scanning means which has been conducted through said optical fiber means in said motor shaft.

2. The horizon sensor as claimed in claim 1 wherein said scanning means includes a mirror arranged to reflect the field of view of said scanning means onto said optical axis.

3. The horizon sensor as claimed in claim 1 wherein said scanning means includes a prism for refracting optical radiation from the field of view of said scanning means to said optical axis.

4. The horizon sensor as claimed in claim 1 wherein said scanning means includes a plurality of mirrors arranged around said optical axis for reflecting radiation from a field of view on said optical axis.

5. A horizon sensor for indicating orientation by sensing a line of discontinuity in infrared radiation in a field of view between a reference body and outer space having an infrared detector means positioned on the optical axis of said horizon sensor for detecting said infrared radiation and generating detector signals in accordance with the intensity of said infrared radiation and scanning means driven by a motor shaft of a motor drive, said scanning means applying said infrared radiation to said infrared detector means, the improvement comprising:

said scanning means mounted on a first end of said motor shaft and including optical means for focusing the instantaneous field of view of said scanning means onto the axis of said motor shaft which coincides with said optical axis, a hole extending axially through said motor shaft, an infrared optical fiber bundle mounted in said hole in said motor shaft for transferring the focal point from said first end of said motor shaft to a second end of said motor shaft, said infrared optical fiber bundle is shaped in elongated linear form on said first end of said motor shaft and terminated on said second end of said second end of said motor shaft in bunched solid circular form, said infrared detector means mounted with respect to said second end of said motor shaft for receiving the infrared radiation applied thereto by said scanning means which has been conducted through said infrared optical fiber bundle in said motor shaft.

* * * * *